US008713068B2

(12) United States Patent
Seet et al.

(10) Patent No.: US 8,713,068 B2
(45) Date of Patent: Apr. 29, 2014

(54) MEDIA IDENTIFICATION SYSTEM WITH FINGERPRINT DATABASE BALANCED ACCORDING TO SEARCH LOADS

(75) Inventors: Nicholas Seet, Los Alamos, NM (US); Rob Johnson, Los Angeles, CA (US); Joshua Smallman, Mountain View, CA (US); Adam Cahan, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 570 days.

(21) Appl. No.: 12/483,222

(22) Filed: Jun. 11, 2009

(65) Prior Publication Data

US 2010/0318587 A1  Dec. 16, 2010

(51) Int. Cl.
*G06F 17/30* (2006.01)

(52) U.S. Cl.
CPC .............................. *G06F 17/30306* (2013.01)
USPC .......................................................... 707/802

(58) Field of Classification Search
CPC ................................................. G06F 17/30306
USPC ......................................... 707/705, 968, 802
See application file for complete search history.

(56) References Cited

U.S. PATENT DOCUMENTS

| | | | | |
|---|---|---|---|---|
| 6,021,211 | A * | 2/2000 | Setlak et al. | 382/124 |
| 6,269,394 | B1 * | 7/2001 | Kenner et al. | 709/217 |
| 7,062,504 | B2 * | 6/2006 | Cantu-Paz et al. | 707/688 |
| 7,110,338 | B2 * | 9/2006 | Cheng et al. | 369/59.1 |
| 7,174,293 | B2 | 2/2007 | Kenyon et al. | |
| 7,194,752 | B1 | 3/2007 | Kenyon et al. | |
| 7,359,889 | B2 * | 4/2008 | Wang et al. | 707/661 |
| 7,516,074 | B2 | 4/2009 | Bilobrov | |
| 7,725,452 | B1 * | 5/2010 | Randall | 707/709 |
| 7,783,489 | B2 | 8/2010 | Kenyon et al. | |
| 7,870,574 | B2 | 1/2011 | Kenyon et al. | |
| 2004/0028281 | A1 | 2/2004 | Cheng et al. | |
| 2004/0088283 | A1 | 5/2004 | Lissar et al. | |
| 2004/0260682 | A1 * | 12/2004 | Herley et al. | 707/3 |

(Continued)

FOREIGN PATENT DOCUMENTS

| | | |
|---|---|---|
| JP | U H04-073251 | 6/1992 |
| KR | 1020060020114 | 3/2006 |

OTHER PUBLICATIONS

PCT International Search Report, PCT Application No. PCT/US10/34449, Jul. 20, 2010, 6 pages.

(Continued)

*Primary Examiner* — Huawen Peng
(74) *Attorney, Agent, or Firm* — James J. DeCarlo; Greenberg Traurig, LLP

(57) ABSTRACT

A media identification system generates reference fingerprints for known media samples and stores the reference fingerprints in a reference database. The media identification system uses the reference fingerprints to match a fingerprint generated from an unknown media sample to identify that unknown sample. When storing new reference fingerprints in the reference database, partitions of the database are selected to balance the search loads on the database when it is used by the media identification system. For example, the selected partitions may be determined based at least in part on the access rates of the partitions by the media identification system. New reference fingerprints will tend to be placed in partitions that have relatively lower access rates that the other partitions, which will tend to balance the search loads on the partitions by the media identification system.

18 Claims, 5 Drawing Sheets

(56) References Cited

U.S. PATENT DOCUMENTS

| | | |
|---|---|---|
| 2005/0203881 A1 | 9/2005 | Sakamoto et al. |
| 2007/0055500 A1 | 3/2007 | Bilobrov |
| 2009/0089334 A1* | 4/2009 | Mohamed et al. ............ 707/200 |
| 2009/0327334 A1* | 12/2009 | Rodriguez et al. ............ 707/102 |

OTHER PUBLICATIONS

Mahedero, J., et al., "Industrial Audio Fingerprinting Distributed System With Corba and Web Services," In Proceedings of International Conference for Music Information Retrieval (ISMIR) 2004.

* cited by examiner

MEDIA IDENTIFICATION SYSTEM WITH FINGERPRINT DATABASE BALANCED ACCORDING TO SEARCH LOADS

BACKGROUND

This invention relates generally to media identification systems, and in particular to the management of a database of reference fingerprints used by a media identification system to match unknown test samples.

Digital fingerprinting is a process that can be used to identify unknown digital media samples, such as audio or video samples. In an example media identification system, digital fingerprints are generated for each of a number of known media samples, which may be obtained from data files, broadcast programs, streaming media, or any of a variety of other media sources. Each digital fingerprint may comprise a data segment that contains characteristic information about a sample of the media from which it was generated. U.S. Pat. No. 7,516,074, which is incorporated by reference in its entirety, describes embodiments for generating characteristic digital fingerprints from a data signal.

The reference fingerprints are then stored in a database, or repository, and indexed in a way that associates the reference fingerprints with their corresponding media samples and/or metadata related to the media samples. U.S. Pat. No. 7,516,074 also discloses embodiments for indexing reference fingerprints in a database. The database of reference fingerprints can be used to identify an unknown media sample. To identify an unknown media item, a test fingerprint is generated from a sample of the media item. The test fingerprint is then matched against the database of reference fingerprints and, if a match is found, the unknown media sample is declared to be media sample associated with the matching reference fingerprint. Various exact matching and fuzzy matching algorithms and criteria for declaring a valid match may be used.

Reference fingerprints are typically indexed in the database according to a common characteristic of the fingerprints, such as a coordinate of the fingerprint vector or some other portion of the data contained in the fingerprint. This type of indexing scheme allows for a multi-staged matching process. For example, the test fingerprint may be examined to determine a preliminary match with one or more candidate sets of reference fingerprints in the database, based on the indexing scheme. Then, each of the identified candidates is compared to the test fingerprint (e.g., bitwise) to determine if there is a match. By narrowing to a list of candidates before the more computationally intensive fingerprint comparison, this multi-staged matching process avoids the necessity of accessing each and every reference fingerprint in the database and then comparing each reference fingerprint to the test fingerprint.

In some applications of a media matching system, unknown media samples are matched against an expanding set of known media samples. For example, the unknown media samples may be video clips from online video sharing websites, and these may be tested against known media samples, such as broadcast programming. As the set of known media samples grows, new reference fingerprints are generated from those samples and are then added to the reference fingerprint database.

In applications where the database of reference fingerprints is very large, the database may be implemented across a number of physical and/or logical partitions, also referred to as "silos." When the reference database comprises multiple partitions, the reference samples are typically distributed across the partitions substantially evenly based on the amount of data contained in each partition. The particular algorithm for storing the reference fingerprints may depend on the source of the media samples from which the reference fingerprints are derived. When obtained from broadcast programming, for example, the samples may be added to the partitions according to the broadcast channel from which they were obtained, or any other meta-property of the samples.

Although this algorithm might tend to balance out the amount of data stored in each partition, it may not lead to an optimal situation for the intended use of the database. This is because in practice, there is often a correlation between the meta-properties of the media samples and their popularity. For example, in an example media matching system, the test samples will often originate more commonly from one particular source than from another. Since the indexing system would group candidates for the test sample into partitions, this would tend to lead to more accessing load (e.g., read requests) on some of the partitions as compared to other partitions. The resulting overloading of some partitions based on accessing by the media matching system would likely result in suboptimal performance of the system.

SUMMARY

When storing reference fingerprints in a reference database of a media identification system, embodiments of the invention balance the search loads on the database when it is used by the media identification system. In particular, when storing one or more new reference fingerprints in the database, embodiments of the invention select one or more partitions of the database in which to store the new reference fingerprints. The selected partitions are determined based at least in part on the access rates (e.g., the number of searches for each partition over a given time period) of the partitions by the media identification system. In one embodiment, new reference fingerprints will tend to be placed in partitions that have relatively lower access rates that the other partitions. Since adding a reference fingerprint to a partition will tend to increase the access rate for that partition, adding new reference fingerprints to partitions of the database having relatively lower access rates will tend to balance the search loads on the partitions by the media identification system.

In one embodiment, the system can create and link new partitions to an existing database to reduce the search loads of the existing partitions. For example, by transferring existing reference data files to the newly created partitions, the search loads of all partitions may become more balanced, thereby improving the overall database access rate. In another embodiment, the system can rebalance the loads on the partitions by moving the existing reference fingerprints within the database according to the access rates of the fingerprints. The partitions may be grouped by meta-information about the reference data, and the balancing of search loads may be done at the group level rather than individually for each new reference fingerprint.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In digital fingerprinting applications, digital fingerprints sampled from unknown audio or video content are compared with a reference database of digital fingerprints taken from known audio or video programming so as to identify the unknown content. Identifying the unknown content is desirable as it may permit the metadata of the unknown content to be repaired, or allow for the control of the distribution of copyrighted material, among many other applications of media identification systems.

Figure 1:
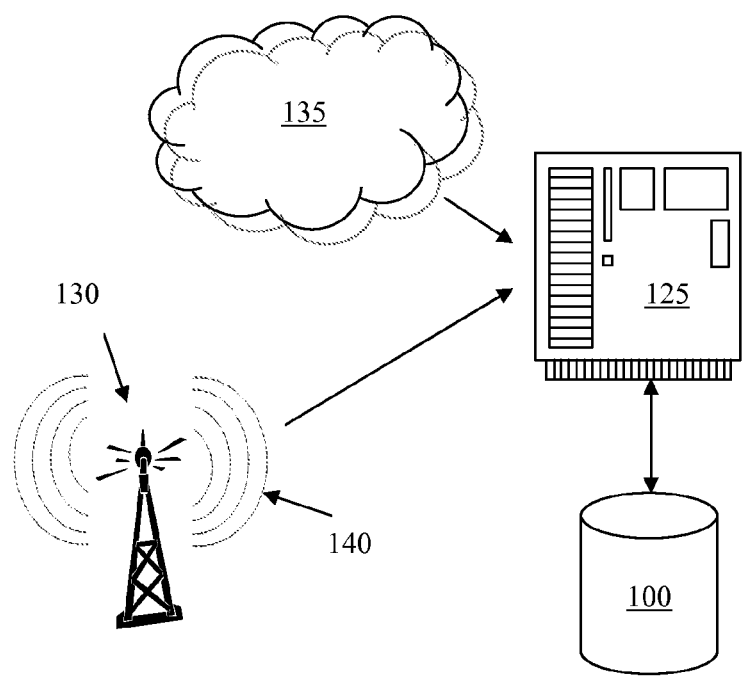
FIG. 1 is a schematic diagram of a media fingerprinting system, in accordance with an embodiment of the invention.

FIG. 1 shows an arrangement for implementing a digital fingerprinting application in a database system. A database 100 of reference fingerprints and a database server 125 are shown. The database server 125 runs a fingerprint generation algorithm that creates reference fingerprints from a media sample. In one embodiment, the database server generates reference fingerprints from broadcast programs 140 transmitted by a broadcaster 130. In another embodiment, the database server 125 samples media content from a computer network 135, such as file sharing networks or an Internet website, and creates reference fingerprints from that sampled media content. The database server 125 stores the generated reference fingerprints on the database 100 so they can be used to identify unknown media samples, as described herein.

Figure 2:
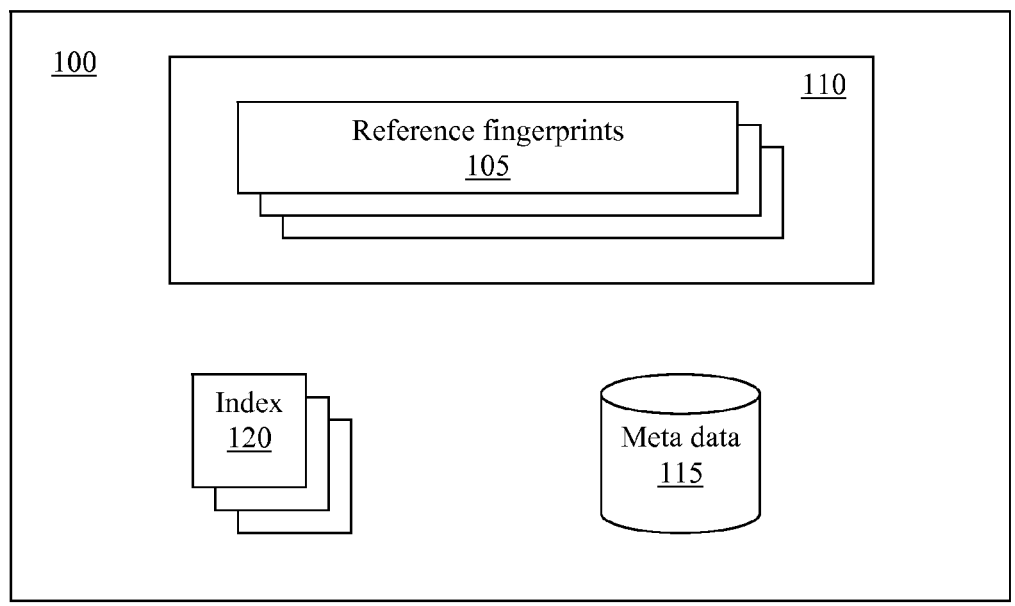
FIG. 2 is a schematic representation of a database of reference fingerprints, in accordance with an embodiment of the invention.

FIG. 2 shows one embodiment of the database 100 in more detail. The database 100 includes a plurality of standard-sized reference fingerprints 105 stored within a data structure 110. The reference fingerprints 105 may comprise digital fingerprints for a portion of audio or video content. Also included in the database 100 is metadata 115 associated with each reference fingerprint 105. Metadata 115 may include information about the digital media content attributed to the reference fingerprints 105, such as the title, artist, genre, producer and copyright date. The metadata 115 may be extracted from the broadcast programs 140 or otherwise obtained by the database server 125. The database 100 also includes a number of indexes 120 that can be used to identify a candidate set of fingerprints that may match a test fingerprint, as will be described in more detail herein.

An indexing method is used to identify a candidate set of reference fingerprints that might match a test fingerprint. The candidate set of fingerprints are identified based on their occurrence in logical predefined "buckets," where each bucket references a group of fingerprints that share the same bit values at certain bit positions specified by a template associated with that bucket. The buckets that contain fingerprints whose bit values match the test fingerprint at the bit positions specified in the corresponding template are marked. Because fingerprints may be referenced in many different buckets and each marked bucket indicates an increased probability that the fingerprints referenced by that bucket are a match, a group of fingerprints may be identified as a candidate set of fingerprints based on their recurrence in the highest marked buckets.

Figure 3:
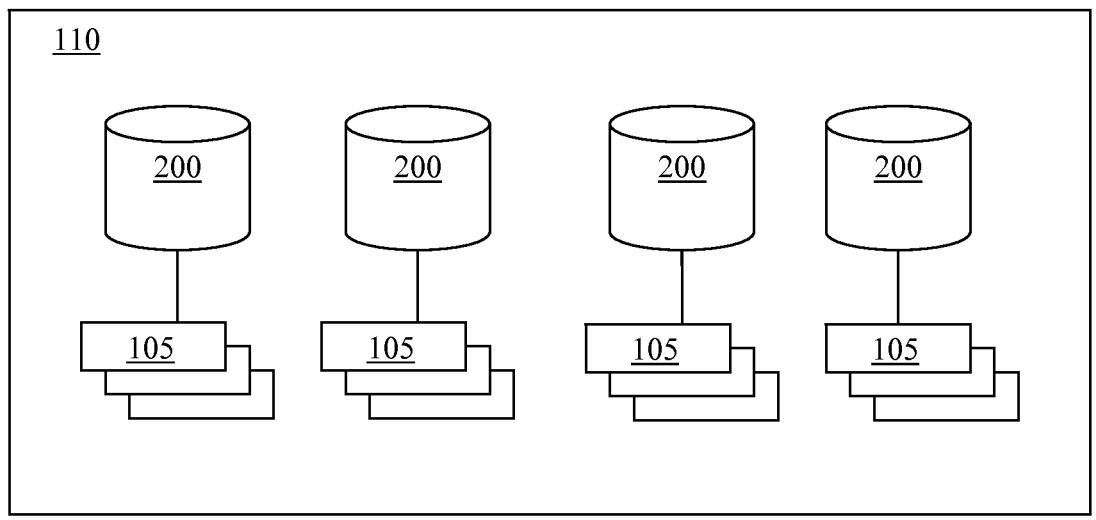
FIG. 3 is a schematic representation of a data structure for storing reference fingerprints in the database of FIG. 2.

FIG. 3 shows the data structure 110 in which the reference fingerprints 105 are stored in more detail. The data structure 110 includes a plurality of data repositories, called partitions 200. In one embodiment, the partitions 200 are defined logically, for example by the LDAP protocol, and the actual data content of each partition 200 may be stored on any number of physical storage media in the same or in different locations. The content of each partition 200 comprises a subset of the reference fingerprints 105.

Figure 4:
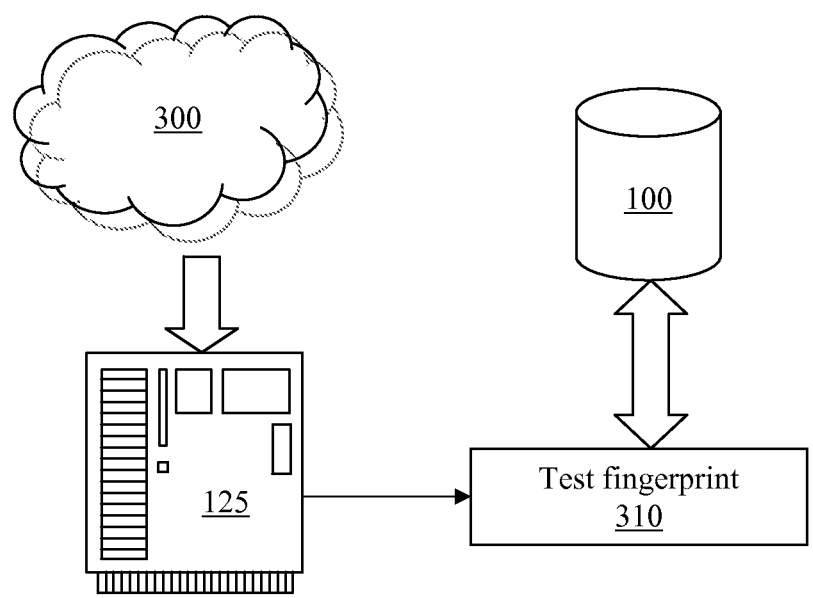
FIG. 4 is a schematic diagram of a database used in a fingerprint matching system, in accordance with an embodiment of the invention.

In a typical matching application, shown in FIG. 4, unknown media content 300 is sampled by the database server 125 to generate a test fingerprint 310. The unknown content 300 may include digital audio or video data sampled from a website, such as a website that permits user-generated content to be uploaded. The sampling may be performed automatically by a software program at the database server 125 or by a remote program that communicates the test fingerprint 310 to the database server 125. Such a software program may be an automatic program commonly referred to as a "robot" or "spider," which automatically crawls the Internet looking for shared audio or video content to sample. The unknown content 300 may also include data that is shared across a file sharing network.

The test fingerprint 310 may be a digital fingerprint that is obtained from a portion of the unknown content 300. Multiple digital fingerprints can be obtained from the same audio or video stream. In one example, a new test fingerprint is generated for every five seconds of sampled content. Once a test fingerprint 310 is obtained, it can be matched against the database 100 to determine whether a reference fingerprint 105 contained in the database 100 matches the test fingerprint 310. If a match is found, the metadata 115 of the matched reference fingerprint 305 can be examined to identify the unknown content 300 and take appropriate further steps, for example, notifying the copyright owner, inserting advertising into the content, or blocking the content. The test fingerprint 310 need not match a reference fingerprint 105 perfectly. Because a loss of fidelity or other distortion due to noise in the unknown content 300 can result in differences between the test fingerprint 310 and the corresponding reference fingerprint 105, partial matches may be considered sufficient for identifying a test fingerprint with a sufficiently high degree of certainty.

Figure 5A:
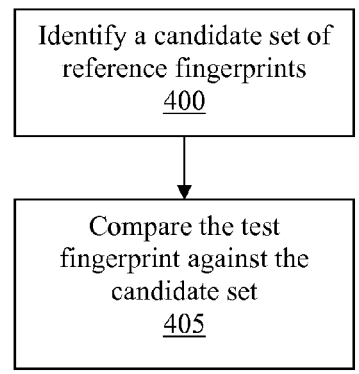
FIGS. 5A and 5B are flowchart diagrams showing the steps performed by an application for matching digital fingerprints, in accordance with an embodiment of the invention.

FIG. 5A shows an overview of a method for matching the test fingerprint 310 against the reference fingerprints 105. In a first step, shown at block 400, a candidate set of reference fingerprints 500 is generated. In a second step, shown at block 405, the test fingerprint 310 is compared against each of the reference fingerprints in the candidate set 500 to determine if they match.

Figure 5B:
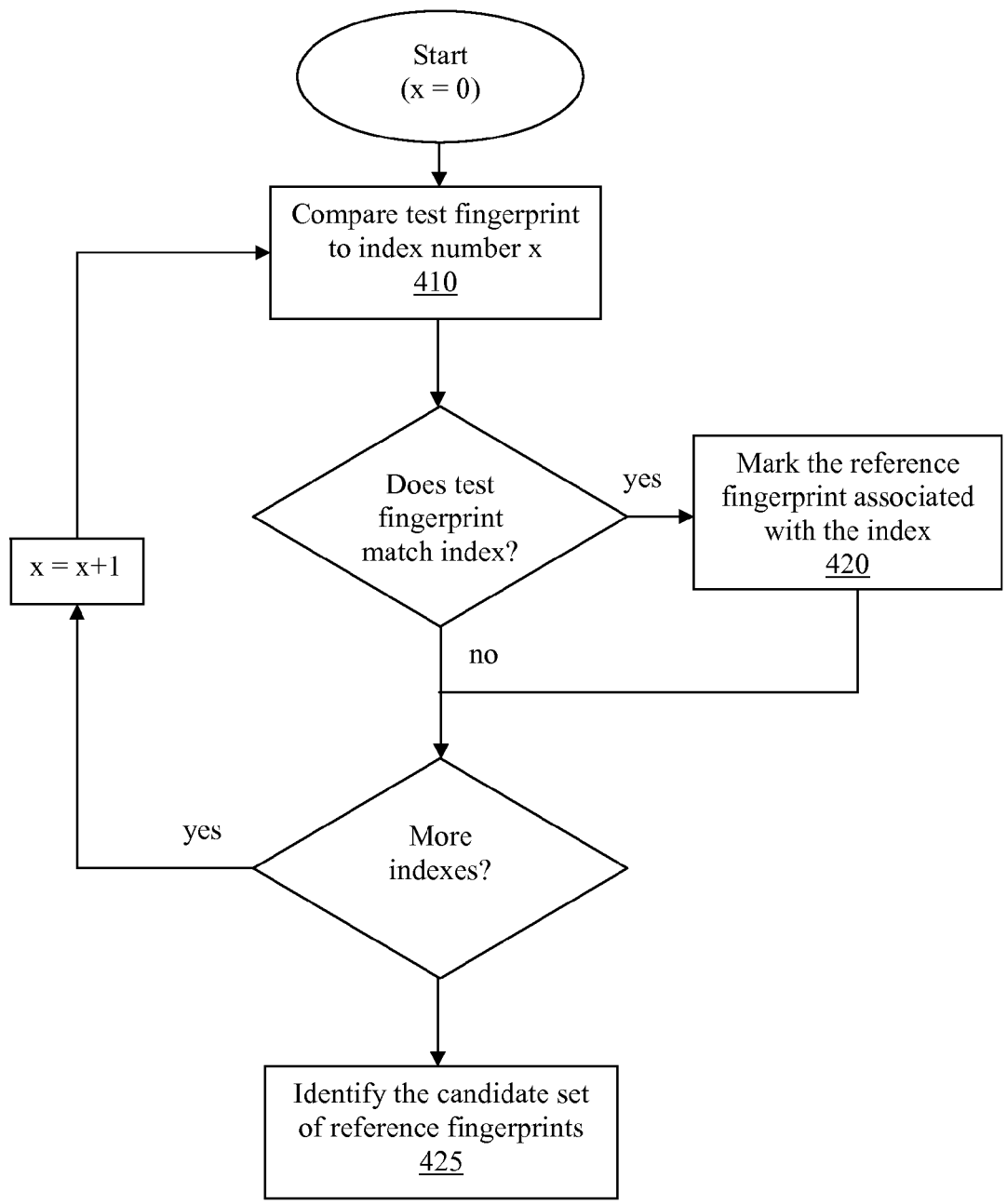

FIG. 5B shows one implementation of the identification step 400 of FIG. 5A. In FIG. 5B, an indexing method is used to identify a candidate set of reference fingerprints 500. Each index 120 indexes the reference fingerprints according to a characteristic of the reference fingerprints. For example, the index may group reference fingerprints that have the same value for a particular coordinate. In a first step, shown at block 410, the test fingerprint 105 is compared to the first index 120 to identify a candidate set of fingerprints that might match the test fingerprint. If it does, then the reference fingerprints associated with the index 120 are marked, as shown at block 420. The process is repeated for each of the indexes 120 until all of the indexes have been compared to the test fingerprint 310 to identify all possible candidate reference fingerprints for the test fingerprint. At the end of this method, a number of reference fingerprints 105 will have been marked. The reference fingerprints 105 may be marked multiple times as a candidate, since they may match the indexed characteristics of the test fingerprint 310 defined by more than one index 120. All candidate reference fingerprints are then grouped, shown at block 425.

In the steps described above, candidate reference fingerprints are identified by the indexes, without having to obtain actual copies of the reference fingerprints. Once the candidate fingerprints are identified, however, copies of the candidate reference fingerprints are obtained so the matching algorithm can compare each identified candidate fingerprint to the test fingerprint to determine whether a match exists. Obtaining a copy of the candidate fingerprints from the reference database may comprise an "access" of the partitions in the database where the candidate reference fingerprints are located, since this is a read operation and is thus a load on the resources of the reference database.

Figure 6:
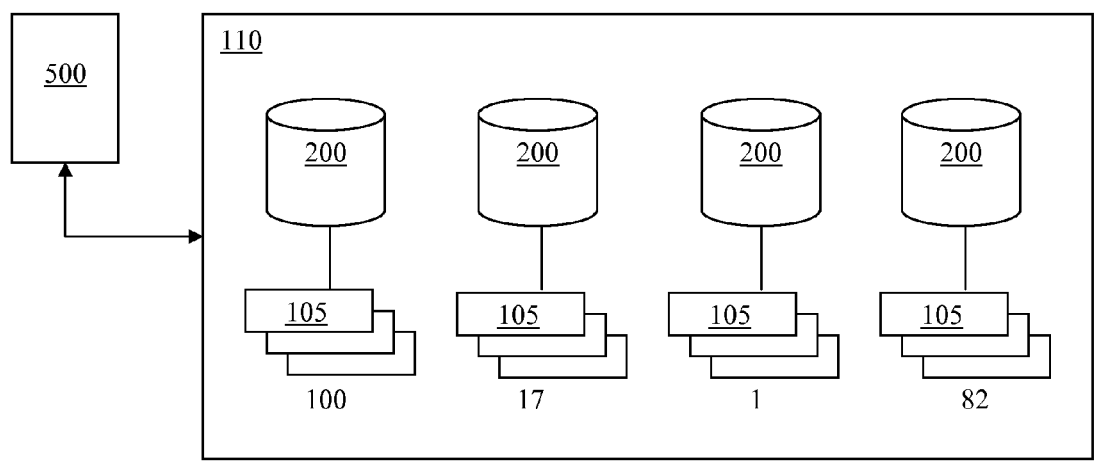
FIG. 6 is an example of the data structure shown in FIG. 3, depicting a candidate set of reference fingerprints to be stored in the data structure.

FIG. 6 shows the data structure 110 with an example in which the candidate set of reference fingerprints 500 in the data structure 110 have been identified. In the example of FIG. 6, four partitions 200 are shown, and these four partitions 200 contain a total of two hundred identified candidate fingerprints. As shown from left to right, a first partition 200 contains one hundred reference fingerprints of the candidate set, a second partition 200 contains seventeen reference fingerprints, a third partition 200 contains one reference fingerprint, and a fourth partition 200 contains eighty-two reference fingerprints.

To identify whether any of the reference fingerprints in the candidate set 500 match the test fingerprint 310, the fingerprint matching algorithm may perform a bit-by-bit comparison between the test fingerprint 310 and each of the reference fingerprints in the candidate set 500. This may be performed during the comparison stage 405 shown in FIG. 5A. To do this comparison, the fingerprint matching system first obtains a copy of the candidate reference fingerprints from each partition 200. This read operation may be carried out in parallel on each of the partitions 200; however, the overall speed of the comparison stage is limited by the speed of the reading from the slowest partition 200, which is likely the partition 200 that holds the greatest number of candidate fingerprints. In this example, the partitions that contain more identified candidate fingerprints will likely take more time to provide fingerprints to the matching algorithm than the partitions containing fewer identified candidate algorithms. Because the number of candidate fingerprints are not balanced equally in this example, and the overall speed of the comparison will be suboptimal. The comparison stage would proceed faster if the candidate set of reference fingerprints 500 were more evenly distributed across the partitions 200. In this case, if the two hundred fingerprints in the candidate set were more evenly distributed, each partition would have about fifty fingerprints in the candidate set, and the overall speed of the matching might be significantly faster.

Figure 7:
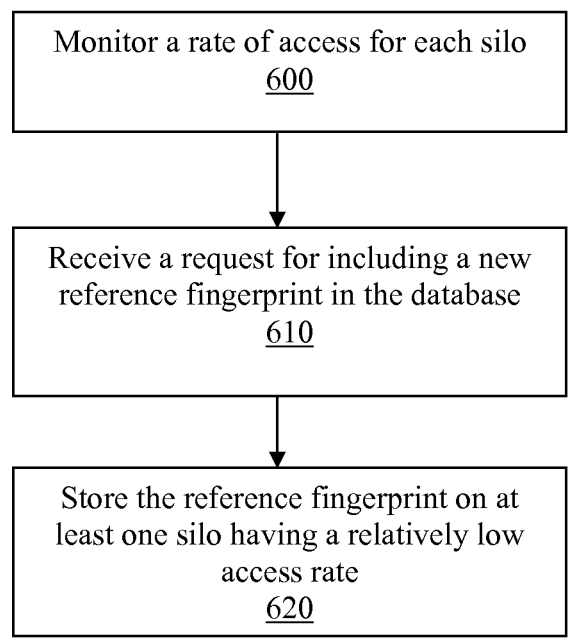
FIG. 7 is a flow diagram of a method for balancing the search loads on a database of reference fingerprints, in accordance with an embodiment of the invention.

FIG. 7 shows a flow diagram of a computer-implemented method for balancing the search load within a database in accordance with the invention. As shown at block 600, a rate of access is monitored for each partition 200. The rate of access is determined as the average number of reference fingerprints on that partition that are included in a candidate set 500 of fingerprints, and is measured over the course of comparing of a plurality of test fingerprints 310. The rate of access can be measured over several time periods, including, but not limited to, monthly, weekly, daily, hourly, by the minute, or by the second.

While monitoring the rate of access for the partitions within the database, the database server 125 may receive a request for adding a new reference fingerprint to the database 100 as shown at block 610. This request can be the result of sampling a known broadcast 140, such as shown in FIG. 1. Then, as shown at block 620, the new reference fingerprint is stored on at least one partition 200 that has a relatively low access rate in comparison to the other partitions 200.

By continually storing new reference fingerprints on the partitions with lower access rates, the access rates across the partitions improve so that they remain roughly even for most searches, and in turn the average search speed may improve. Reference fingerprints may also be dynamically redistributed to load balance the access rates of the partitions.

Instead of only storing new reference fingerprints on the partitions with lower access rates, the database could also be periodically rebalanced by transferring reference fingerprints from partitions with higher access rates to partitions with lower access rates. This could either be performed continually or at specified scheduled maintenance times.

Additionally, reference fingerprints may be stored on partitions in groups, with the determination of the optimal location for the reference fingerprints being done at a group level rather than individually for each reference fingerprint. For example, when reference fingerprints are generated for a particular episode of a broadcast program, all of the reference fingerprints for that episode may be stored on the partition with the lowest access rate. Only when the next episode is broadcasted, the newly created reference fingerprints for that piece of content may then be stored in a group of partitions, having relatively low access rates, for that episode. Alternatively, a designated number or data size of reference fingerprints may be grouped together to locate where in the database the group is to be stored.

In one embodiment, it may be desirable to add partitions to the group of partitions as the database grows, rather than simply increasing the size of the existing partitions. When partitions are added, one method of implementing the new partitions in the database system is to transfer reference fingerprints from one or more of the existing partitions to the new partition. In doing so, the access rate of the new partition can be expected to be roughly the same or less as the average access rate of the existing partitions.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing media fingerprints in a reference database comprising a plurality of partitions, each partition storing a set of reference fingerprints generated from known media samples, the reference fingerprints used to identify unknown digital media samples;
    monitoring access rates of the partitions of the reference database by a media identification system, wherein an access rate of a partition is determined as the average number of reference fingerprints on that partition that are included in a candidate set of fingerprints, wherein the candidate set of fingerprints comprises a subset of reference fingerprints in the partition that match a test fingerprint associated with an unknown digital media sample;
    receiving a request to store one or more new reference fingerprints in the reference database;
    selecting a partition of the reference database based at least in part on the access rates of the partitions; and
    storing the new reference fingerprints in the selected partition of the reference database,
    wherein the storing media fingerprints in a reference database further comprises indexing the reference fingerprints in the database by a characteristic of the reference fingerprints, and
    grouping reference fingerprints having the same indexed characteristic in the same partition of the reference database.

2. The method of claim 1, wherein each partition is a logically defined data repository of the reference database.

3. The method of claim 1, wherein the reference database further comprises metadata about the known media samples corresponding to the reference fingerprints in the reference database.

4. The method of claim 1, wherein the access rate for a particular partition of the reference database comprises a number of requests to read reference fingerprints from the partition over a designated time period.

5. The method of claim 1, wherein one or more of the reference fingerprints are generated from known audio samples.

6. The method of claim 1, wherein one or more of the reference fingerprints are generated from known video samples.

7. A non-transitory computer readable storage medium for tangibly storing thereon computer instructions for execution by a processor, the computer instructions for performing the steps of:
    storing media fingerprints in a reference database comprising a plurality of partitions, each partition storing a set of reference fingerprints generated from known media samples, the reference fingerprints used to identify unknown digital media samples;
    monitoring access rates of the partitions of the reference database by a media identification system, wherein an access rate of a partition is determined as the average number of reference fingerprints on that partition that are included in a candidate set of fingerprints, wherein the candidate set of fingerprints comprises a subset of reference fingerprints in the partition that match a test fingerprint associated with an unknown digital media sample;
    receiving a request to store one or more new reference fingerprints in the reference database;
    selecting a partition of the reference database based at least in part on the access rates of the partitions; and
    storing the new reference fingerprints in the selected partition of the reference database,
    wherein the storing media fingerprints in a reference database further comprises indexing the reference fingerprints in the database by a characteristic of the reference fingerprints, and
    grouping reference fingerprints having the same indexed characteristic in the same partition of the reference database.

8. The non-transitory computer readable storage medium of claim 7, wherein each partition is a logically defined data repository of the reference database.

9. The non-transitory computer readable storage medium of claim 7, wherein the reference database further comprises metadata about the known media samples corresponding to the reference fingerprints in the reference database.

10. The non-transitory computer readable storage medium of claim 7, wherein the access rate for a particular partition of the reference database comprises a number of requests to read reference fingerprints from the partition over a designated time period.

11. The non-transitory computer readable storage medium of claim 7, wherein one or more of the reference fingerprints are generated from known audio samples.

12. The non-transitory computer readable storage medium of claim 7, wherein one or more of the reference fingerprints are generated from known video samples.

13. A media identification system comprising:
a processor;
a reference database in communication with the processor, the reference database comprising a plurality of partitions, each partition storing a set of reference fingerprints generated from known media samples;
a fingerprint matching algorithm, executed by the processor, configured to match an unknown media sample by comparing a test fingerprint generated from the unknown media sample with one or more reference fingerprints in the reference database;
a fingerprint generation algorithm, executed by the processor, configured to generate new reference fingerprints from known media samples, and further configured to store new reference fingerprints in partitions of the reference database selected at least in part on the access rates of the partitions by the fingerprint matching algorithm, wherein an access rate of a partition is determined as the average number of reference fingerprints on that partition that are included in a candidate set of fingerprints, wherein the candidate set of fingerprints comprises a subset of reference fingerprints in the partition that match the test fingerprint,
wherein the reference database further comprises an index that indexes the reference fingerprints by a characteristic of the reference fingerprints, and
wherein the reference fingerprints having the same indexed characteristic are grouped in the same partition of the reference database.

14. The system of claim 13, wherein each partition is a logically defined data repository of the reference database.

15. The system of claim 13, wherein the reference database further comprises metadata about the known media samples corresponding to the reference fingerprints in the reference database.

16. The system of claim 13, wherein the access rate for a particular partition of the reference database comprises a number of requests to read reference fingerprints from the partition over a designated time period.

17. The system of claim 13, wherein one or more of the reference fingerprints are generated from known audio samples.

18. The system of claim 13, wherein one or more of the reference fingerprints are generated from known video samples.

* * * * *